United States Patent [19]
Dyer

[11] 3,848,918
[45] Nov. 19, 1974

[54] TAILGATE RELEASE
[75] Inventor: James L. Dyer, Sparta, Mich.
[73] Assignee: Rewop Company, Grand Rapids, Mich.
[22] Filed: Mar. 12, 1973
[21] Appl. No.: 340,369

[52] U.S. Cl.................... 296/57 R, 16/176, 49/463
[51] Int. Cl............................................. B62d 25/00
[58] Field of Search ..... 296/50, 51, 53, 57 R, 57 A, 296/59, 60; 16/147, 176; 49/194, 463; 292/173

[56] References Cited
UNITED STATES PATENTS
| | | | |
|---|---|---|---|
| 2,430,942 | 11/1947 | McGiff | 16/176 |
| 3,066,964 | 12/1962 | Lemaire | 292/176 |
| 3,734,560 | 5/1973 | Cramblet | 296/50 |

Primary Examiner—Robert G. Sheridan
Assistant Examiner—Donald W. Underwood
Attorney, Agent, or Firm—Price, Heneveld, Huizenga & Cooper

[57] ABSTRACT

Hinge apparatus especially adapted to provide a quick release for removing tailgates from pick-up trucks and the like, the apparatus being positioned between the tailgate of the truck and casing therearound. The hinge includes a pin biased into a cavity in the tailgate and retractable therefrom via a release means having an actuator exposed only when the tailgate is open. This entire hinge apparatus can be adapted for mounting to the truck in the same manner as the original equipment hinge, with no adaptation of the truck being required.

21 Claims, 4 Drawing Figures

PATENTED NOV 19 1974　　　　　　　　　3,848,918

TAILGATE RELEASE

This invention relates to hinge mechanisms for vehicle closures, and, more particularly, to a quick release hinge apparatus especially adapted to facilitate the removal of a tailgate from a pickup truck or the like.

BACKGROUND OF THE INVENTION

In recent years, pickup trucks and automobiles incorporating pickup beds therein have become increasingly popular for transporting campers for recreational purposes as well as oversized loads and the like. When a camper is loaded onto the bed of a pickup truck or other similar vehicle, it is ordinarily necessary that the tailgate or rear door closure of the pickup bed be removed. It serves no function with the camper in place. When the camper is properly positioned, it may prevent even the closing of the tailgate. Therefore, the removal of the tailgate is a necessity until the camper is removed from the vehicle.

Generally, standard equipment tailgates on most vehicles are secured to the side walls of the truck on hinge pins which are received in apertures at the base of the tailgate. In order to remove the tailgate, it is necessary to unbolt the hinge pin mounting plate from the truck body. Since such mounting plates are small and often difficult to gain access to, this becomes a cumbersome process, especially if it must be repeated often.

One prior art mechanism is suggested as a substitute for the original equipment hinge. A rectangularly-shaped axle pin is substituted for the typically round pin. The tailgate itself is cut through to an axle-receiving aperture at the bottom thereof. The tailgate may be lifted up off the rectangular axle pin for removal after the tailgate is rotated to a certain position. Although faster than the standard system, this apparatus requires that the tailgate be specially cut to receive the rectangular pin, thereby preventing its use with standard equipment tailgates.

Other prior systems have utilized retractable hinge pins on the tailgate edges which are withdrawn by mechanisms positioned on the exterior of the tailgate. Although these systems also allow faster removal than the standard systems, the positioning of the release mechanisms on the exterior of the tailgate often allows the tailgate to be removed prematurely by the accidental bumping of the mechanism against another object. Further, such exterior mechanisms also severely detract from the aesthetic appeal of the vehicle design in and around the tailgate area. Finally, such mechanisms are not readily interchangeable with original equipment hinge mechanisms employed by truck manufacturers. Thus, they don't do the average consumer much good.

SUMMARY OF THE INVENTION

The present invention provides a quick release hinge apparatus for tailgates and other closures which is bolted in the same position as a standard or conventional tailgate hinge pin, but which includes a retractable mounted hinge pin and means for retracting the same. The assembly is located entirely between the casing adjacent the tailgate and the edge of the tailgate when the tailgate is closed such that undesired or premature removal of the tailgate is prevented. The means for retracting the axle pin and thereby releasing the tailgate are accessible only when the tailgate is swung to its normally open position.

In its basic form, the invention provides an axially movable hinge pin mounted coaxially with the pivot axis of the tailgate. The pin is received in a correspondingly shaped receptacle in a housing secured to the casing surrounding the tailgate between the tailgate edge and the casing. The pin is biased outwardly away from the casing by a biasing means and is received in a tailgate cavity which is coaxial with the pivot axis of the tailgate. Since the hinge pin is generally smaller than the standard or normal axle pin provided for the tailgate, an insert having a receptacle corresponding in size to the hinge pin is normally mounted in the cavity in the tailgate.

One of two types of release means for withdrawing the hinge pin from the tailgate cavity may be used. In one form, the release means comprises a pivotal lever engaging a dog secured to the hinge pin. In another form, the release means comprises a flexible cable secured to the hinge pin and extending through the receptacle in the housing. In either case, the lever or the free end of the flexible cable is positioned between the tailgate edge and tailgate casing such that it is exposed only when the tailgate is open.

These and other objects, advantages, purposes, and features of the invention will become more apparent from a study of the following description taken in conjunction with the drawings.

DESCRIPTION OF THE PREFERRED EMBODIMENT

Figure 1:
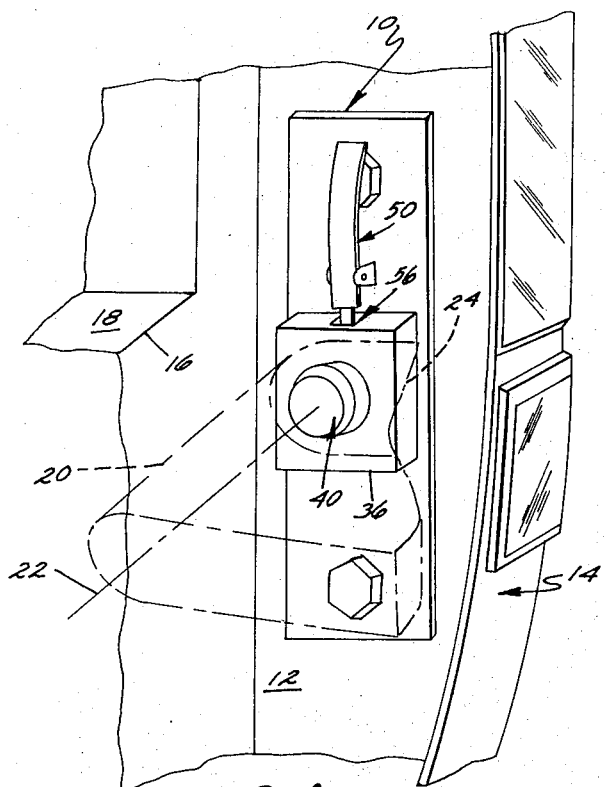
FIG. 1 is a fragmentary, perspective view showing one embodiment of the hinge apparatus of the present invention positioned on the tailgate casing of a truck body adjacent the truck bed, a fragmentary portion of the tailgate being shown in phantom.

Referring now to FIG. 1, a first embodiment 10 of the hinge apparatus of the present invention is shown secured to a side wall 12 of a typical pickup truck 14 adjacent the rear edge 16 of the pickup truck bed 18. A tailgate 20 (partially shown in phantom) generally extends transversely of the truck 14 across the rear of the bed 18 adjacent edge 16 between side wall 12 and its counterpart on the opposite side of the rear of the truck. Tailgate 20 pivots about a pivot axis 22, extending along and generally parallel to the lower edge of the tailgate, between a generally vertical position closing off the bed of the truck (FIGS. 2 and 3) and a generally horizontal position providing a rear opening thereinto (FIG. 1). The hinge apparatus 10, including a retractable hinge pin 40 which is retractable from the tailgate via a release means 50, is secured in place of the original equipment hinge pin normally used to secure the tailgate to the truck. Thus, the apparatus 10 is mounted on the side wall 12 which provides a casing adjacent the end edge 24 of tailgate 20, the apparatus being located generally between the casing and the end edge 24.

Figure 2:
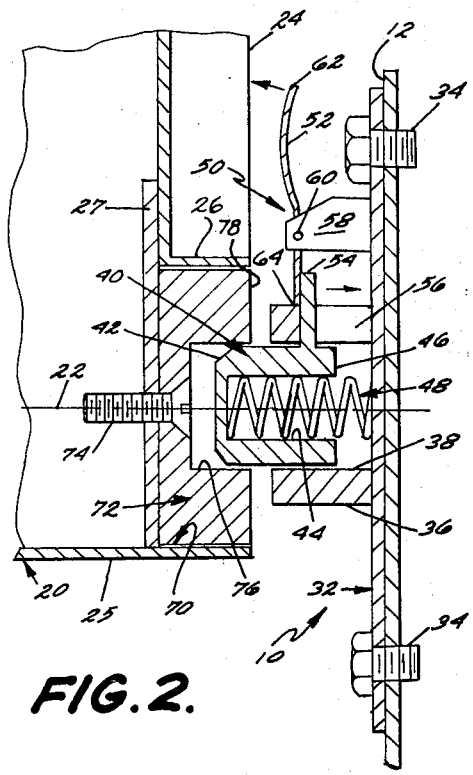
FIG. 2 is a fragmentary, side elevation of the first embodiment of the hinge apparatus as shown in FIG. 1 mounted between the tailgate and an adjacent casing therefor.

As shown in FIG. 2, hinge apparatus 10 includes a generally rectangular base or mounting plate 32 secured against a generally planar area of the side wall or tailgate casing 12 via conventionally known means such as bolts 34. Bolts 34 are threaded into the same holes which are used to mount the original equipment hinge pin. Secured via welding or other conventionally known means in the medial or central portion of base or mounting plate 32 is a rectangular housing 36. Housing 36 includes a receptacle or aperture 38 receiving a correspondingly shaped hinge pin 40 which releasably supports the tailgate 20. Aperture or receptacle 38 is generally slightly larger than the outside dimension of the hinge pin 40 and, in the preferred embodiment, is circular in cross-section as is the pin 40. Thus, receptacle 38 has a diameter which is slightly larger than the outside diameter of pin 40. Consequently, pin 40 is easily slidably mounted and slip fitted within receptacle 38.

Hinge pin 40 includes a beveled edge 42 to facilitate its reception in the tailgate 20. A central, right circular aperture 44 is bored partially through the pin 40 from its bottom 46 or side adjacent base plate 32. A biasing means such as coil spring 48 is seated within bore 44 and acts against the surface of mounting plate 32 to bias the hinge pin 40 away from the casing or side wall 12 toward the tailgate 20.

Operatively engaged with the biased hinge pin 40 is a release means 50 comprising a pivotally mounted handle 52 and a pin or dog 54 secured to the outer surface of hinge pin 40. Dog 54 extends radially outwardly from the cylindrical hinge pin 40 through a slot 56 (FIG. 1) provided in housing 36. Slot 56 extends from the base of housing 36 such that hinge pin 40 can be slipped into bore 44 with dog 54 sliding into slot 56. Lever 52, which is pivotally mounted on pivot pin 60 between supports 58 secured to mounting plate 32, engages one surface of dog 54 such that when the free end 62 of lever 52 is pulled outwardly away from the casing 12 and mounting plate 32, the operative end 64 will force or cam the dog 54 and hinge pin 40 in the opposite direction toward mounting plate 32 against the bias of coil spring 48.

Figure 4:
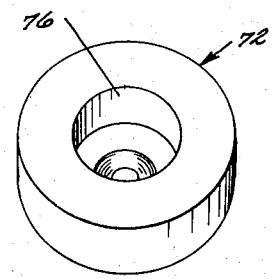
FIG. 4 is a perspective view of the insert adapted for mounting on the tailgate and receiving the hinge pin of the present invention.

Hinge pin 40 is received in the tailgate 20 coaxially with the pivot axis 22 thereof in a recess cavity 70. Cavity 70 is formed in the end edge 24 adjacent the bottom of the tailgate between the bottom wall 25, end wall 26, and securing plate 27 as shown in FIG. 2. Cavity 70 is original equipment. Normally, the cavity 70 included in the end edge 24 of the typical tailgate 20 is circular in cross-section but has a diameter larger than the diameter of the hinge pin 40 of the present invention. This is because the entire hinge apparatus 10 is designed to be mounted on the same bolt holes as the original equipment hinge pin and yet must include more components. Thus, the retractable hinge pin of the present invention will typically have to be smaller in diameter than cavity 70. Accordingly, a cylindrical insert 72, shown in FIGS. 2 and 4, is secured via a countersunk screw 74 or other means to securing plate 27 in cavity 70. Insert 72 includes a cylindrical aperture or receptacle 76 having a cross-sectional diameter which is slightly larger than the outside diameter of hinge pin 40. Accordingly, pin 40 may be easily slip-fitted into receptacle 76 by the biasing action of spring 48. The head of screw 74 is flush mounted in aperture 76 to maximize the space available for receiving pin 40. When pin 40 is received in receptacle 76, a bearing is formed coaxially with pivot axis 22 on at least a portion of the outside surface of the pin such that the tailgate 20 may be easily swung or pivoted between its open and closed positions therearound.

Figure 3:
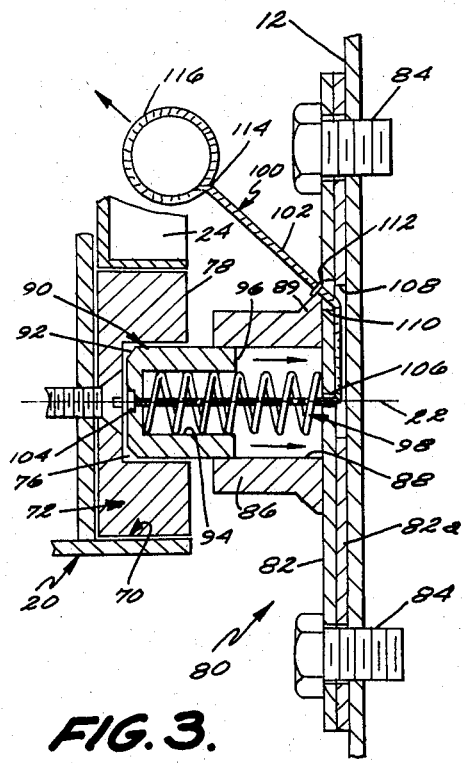
FIG. 3 is a fragmentary, side elevation of a second embodiment of the hinge apparatus of the present invention mounted between a tailgate and an adjacent casing therefor.

A second embodiment 80 of the hinge apparatus of the present invention is shown in FIG. 3. Embodiment 80 is similar to embodiment 10 but includes a different type of release means 100. Embodiment 80 is also secured to the side wall or casing 12 such that its hinge pin 90 is aligned coaxially with the pivot axis 22 of a typical tailgate 20. Embodiment 80 includes a base or mounting plate 82 secured to a generally planar area of the casing 12 via conventionally known means such as bolts 84. A generally cylindrical housing 86 is secured to the medial or central portion of the mounting plate 82 via welding or the like and includes a passageway, aperture or receptacle 88 extending therethrough and having a generally circular cross-sectional shape. A generally cylindrical hinge pin 90 is slidably received in receptacle 88. Receptacle 88 has a diameter slightly larger than that of hinge pin 90 such that the latter may easily slide therein. Hinge pin 90 includes a beveled edge 92 to facilitate reception in the tailgate and a central, coaxial aperture or bore 94 extending partially through the pin 90 from its bottom surface 96. A biasing means such as coil spring 98 is received or seated within bore 94 and biases pin 90 away from mounting plate 82 and casing 12 toward tailgate 20.

Operably associated with the hinge pin 90 is a release means 100 of a different type than release means 50 shown and described above. Release means 100 includes a flexible cable 102 of flexible, woven steel wire or the like which is secured via conventional means to the central portion of pin 90 at 104 and extends coaxially with pivot axis 22, hinge pin 90, and receptacle 98 through the entirety of bore 94 and receptacle 88. The cable passes out of receptacle 88 through a port or aperture 106 in mounting plate 82 along and parallel to the back surface of mounting plate 82. Plate 82 includes a second or backing plate 82a with a channel 108 formed therein. Channel 108 extends from port 106 to a second port 110 in base plate 82. Channel 108 is defined by an aperture cut through backing plate 82a. However, backing plate 82a and mounting plate 82 could be an integral casting or the like with channel 108 cast or machined in. Cable 102 passes through port 106, through channel 108 and back through base plate 82 through port 110. A stop 112 is secured to cable 102 in order to limit the extension of pin 90 from receptacle 88. Attached to the free end 114 of cable 102 is a pull such as ring 116. Accordingly, when the tailgate is in its closed position, ring 116 is located between the end edge 24 and casing 12.

As in embodiment 10 of the hinge apparatus, the hinge pin 90 of the embodiment 80 is biased outwardly away from casing 12 and into a cylindrical receptacle 76 having a diameter slightly larger than that of the pin 90. As in the other embodiment of the apparatus, receptacle 76 is included in an insert 72 which is bolted or otherwise secured within the existing recess cavity 70 in the end edge 74 of tailgate 20. Operation of the release means 100 thereby withdraws the hinge pin 90 against the biasing force of spring 98 past the end surface 78 of insert 72 such that the tailgate may be pivoted away from its pivot axis 22 for quick and easy removal from the truck 14.

As will now be understood, the operation of either quick release hinge apparatus 10 or 80 is basically the same. The bolt holes in mounting plates 32 or 82 are located to correspond to the location of the bolt holes in an original equipment hinge assembly for a particular truck. The original hinge is removed and the present hinge mounted in its place. Of course, the invention could also be used as original equipment.

With the tailgate 20 in its generally vertical, closed position (FIGS. 2 and 3), either of the release means 50 or 100 are hidden between the end edge 24 of tailgate 20 and the casing or side wall 12. Conventional securing means are included at another position on the tailgate to fasten it in such a vertical, closed position or to allow the tailgate to be pivoted to its horizontal, open position. In order to gain access to the release means, the tailgate is pivoted downwardly to its generally horizontal, open position as shown in FIG. 1. Subsequently, lever 52 of embodiment 10 or pull 116 of embodiment 80 are actuated as indicated in FIGS. 2 and 3 to withdraw the hinge pins 40 or 90, respectively, from receptacles 76 toward casing 12. Once the end surface of either the hinge pins 40 or 90 is retracted past the end surface 78 of the insert 72, the tailgate may be swung off its pivot axis 22 and pulled from its standard hinge axle on its opposite ends on the opposite side wall of the truck. Consequently, it is ordinarily necessary only to utilize one of the hinge apparatuses of the present invention adjacent one of the edges of the tailgate to provide the quick release mechanism. It will be noted that the hinge pins 40 and 90 extend away from casing 12 and the ends of housings 36 and 86, respectively, a sufficient distance to provide a strong, secure bearing surface about which the tailgate 20 may swing or pivot. However, the sliding engagement of the hinge pins and receptacles 38, 88, and 76 make actuation of the release means 50 and 100 very easy thereby facilitating the removal of the tailgate.

The invention will thus be understood to provide a convenient and inexpensive quick release mechanism for the removal of tailgates and other closures from trucks, other vehicles, or the like. In either of the embodiments of the invention, the apparatus is enclosed between an end edge of the tailgate and the side wall or casing of the truck. Further, when the tailgate or closure is in its normally closed position, the actuating means for releasing the hinge apparatus for removal of the tailgate are protected by the tailgate edge and adjacent casing. Thus, premature or undesired tampering or actuation of the release means is effectively prevented, while easy access to the release means is provided merely by pivoting the tailgate or closure to its open position.

It will be understood that the terms "horizontal," "vertical," "top," and "bottom" are used for descriptive purposes only and are not intended to limit the scope of the invention described herein. Consequently, the apparatus of the present invention may be secured in other positions without deviating from the spirit thereof.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows.

1. Apparatus for removably, pivotally securing a tailgate to a vehicle, including a tailgate pivotable between an open and closed position, and a casing framing at least a portion of said tailgate, said tailgate having an edge including an aperture adjacent said casing for receiving a hinge pin, said apparatus comprising: a hinge pin positioned adjacent said tailgate aperture; a base plate secured to said casing adjacent an edge of said tailgate including said aperture and between said edge of said tailgate and said casing; said base plate having a housing mounted thereon and projecting from only one side of said base plate, towards said tailgate whereby said base plate can be mounted against said casing without the need for providing accomodations for the housing; said housing including a receptacle slidably receiving said hinge pin release means mounted on said base plate and being operably connected to said hinge pin for axially moving said hinge pin; said release means including means located between said edge of said tailgate and said casing for actuating said release means whereby said hinge pin is withdrawn to permit removal of said tailgate from said vehicle; said actuating means being protected between said tailgate edge and casing when said tailgate is in its closed position and accessible when said tailgate is in its open position.

2. The apparatus of claim 1 wherein said hinge pin includes a pin having a cylindrical portion received in said tailgate around which said tailgate pivots.

3. The apparatus of claim 2 wherein an insert is mounted on said tailgate; said insert including a cylindrical receptacle comprising said tailgate aperture; said receptacle receiving said cylindrical portion of said pin.

4. The apparatus of claim 1 wherein said release means comprise a biasing means biasing said hinge pin away from said casing and a dog extending outwardly from said hinge pin; said actuating means comprising a lever engaging said dog.

5. The apparatus of claim 1 wherein said release means comprise a biasing means biasing said hinge pin away from said casing and a flexible cable having a free end and an end secured to said hinge pin; said actuating means comprising a pull secured to the said free end of said cable.

6. The apparatus of claim 1 wherein a biasing means biases said hinge pin away from said casing and into said tailgate aperture.

7. A hinge apparatus for releasably securing a hinged, swingable tailgate to a vehicle said vehicle normally including a conventional hinge pin including a tailgate and a casing at least partially framing said tailgate, said tailgate including an aperture for receiving a hinge pin and said casing including means for mounting a conventional hinge pin thereto, adjacent said aperture, said hinge apparatus comprising; a mounting base for securing to said casing, said mounting base including a housing projecting from only one side thereof towards said tailgate whereby said mounting base can be mounted against said casing without the need for providing accomodation for said housing; a hinge pin retractably movably mounted in said housing and projecting therefrom towards said tailgate aperture when said mounting base is mounted to said casing; release means for retractably moving said pin towards said mounting base, away from said aperture whereby said tailgate can be disengaged therefrom; attachment means on said mounting base adapted to cooperate with said hinge pin mounting means whereby said mounting base can be secured to said casing.

8. The hinge apparatus of claim 7 in which said release means are positioned between said casing and the edge of said tailgate when said hinge apparatus is mounted on said casing and the tailgate is closed whereby said release mechanism can be actuated only when said tailgate is open.

9. The apparatus of claim 8 including said hinge pin being slidably received in said housing; bias means normally biasing said hinge pin to a position projecting outwardly from said housing.

10. The hinge apparatus of claim 9 wherein said biasing means is enclosed within said housing behind said hinge pin.

11. The hinge apparatus of claim 10 wherein said release means comprises a dog secured to said hinge pin and extending outwardly through an opening in said housing and a lever pivotally mounted on said mounting base, said lever engaging said dog whereby pulling the end of said lever away from said mounting base acts on said dog to retract said hinge pin into said housing.

12. The hinge apparatus of claim 10 wherein said release means comprises a flexible cable having a free end and an end secured to said hinge pin; said cable extending through said housing through a channel in said mounting base and out of said mounting base through a port spaced from said housing such that said free end of said cable is accessible when the tailgate is in an open position.

13. The hinge apparatus of claim 7 in which said conventional hinge pin is a first hinge pin mounted directly to said casing on said hinge pin mounting means, said tailgate aperture being adapted to receive said first hinge pin, and said first hinge pin being removably mounted to said hinge pin mounting means; said hinge pin of said hinge apparatus comprising a second hinge pin which, in conjunction with the rest of said hinge apparatus, can be substituted in place of said first hinge pin.

14. The hinge apparatus of claim 13 which includes an insert for mounting in said aperture in said tailgate, said insert including an aperture therein which is smaller in diameter than said tailgate aperture whereby said second hinge pin may be of a smaller diameter than said first hinge pin and can thereby be more readily mounted on said mounting base.

15. The apparatus of claim 13 including said second hinge pin being slidably received in said housing; bias means normally biasing said second hinge pin to a position projecting outwardly from said housing.

16. The hinge apparatus of claim 15 wherein said release means comprises a dog secured to said second hinge pin and extending outwardly through an opening in said housing and a lever pivotally mounted on said mounting base, said lever engaging said dog whereby pulling the end of said lever away from said mounting base acts on said dog to retract said second hinge pin into said housing.

17. The hinge apparatus of claim 15 wherein said release means comprises a flexible cable having a free end and an end secured to said second hinge pin; said cable extending through said housing through a channel in said mounting base and out of said mounting base through a port spaced from said housing such that said free end of said cable is accessible when the tailgate is in an open position.

18. The apparatus of claim 7 including said hinge pin being slidably received in said housing; bias means normally biasing said hinge pin to a position projecting outwardly from said housing.

19. The hinge apparatus of claim 18 wherein said biasing means is enclosed within said housing behind said hinge pin.

20. The hinge apparatus of claim 19 wherein said release means comprises a dog secured to said hinge pin and extending outwardly through an opening in said housing and a lever pivotally mounted on said mounting base, said lever engaging said dog whereby pulling the end of said lever away from said mounting base acts on said dog to retract said hinge pin into said housing.

21. The hinge apparatus of claim 19 wherein said release means comprises a flexible cable having a free end and an end secured to said hinge pin; said cable extending through said housing through a channel in said mounting base and out of said mounting base through a port spaced from said housing such that said free end of said cable is accessible when the tailgate is in an open position.

* * * * *

UNITED STATES PATENT OFFICE
CERTIFICATE OF CORRECTION

Patent No. 3,848,918    Dated November 19, 1974

Inventor(s) James L. Dyer

It is certified that error appears in the above-identified patent and that said Letters Patent are hereby corrected as shown below:

Column 6, line 9;

After "vehicle," insert --- said vehicle ---.

Signed and sealed this 11th day of February 1975.

(SEAL)
Attest:

RUTH C. MASON
Attesting Officer

C. MARSHALL DANN
Commissioner of Patents
and Trademarks